United States Patent
Gries et al.

(10) Patent No.: US 6,580,232 B2
(45) Date of Patent: Jun. 17, 2003

(54) DYNAMIC FOCUS VOLTAGE AMPLITUDE CONTROLLER

(75) Inventors: Robert Joseph Gries, Indianapolis, IN (US); James Albert Wilber, Indianapolis, IN (US); Ronald Eugene Fernsler, Indianapolis, IN (US); William Benjamin Aaron, Greenwood, IN (US)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 10/081,508

(22) Filed: Feb. 22, 2002

(65) Prior Publication Data

US 2002/0145395 A1 Oct. 10, 2002

Related U.S. Application Data

(60) Provisional application No. 60/282,782, filed on Apr. 10, 2001.

(51) Int. Cl.$^7$ ................................................. G09G 1/04
(52) U.S. Cl. .............. 315/368.21; 315/371; 315/368.22
(58) Field of Search ........................... 315/371, 368.21, 315/368.22, 368.23

(56) References Cited

U.S. PATENT DOCUMENTS

| | | |
|---|---|---|
| 4,490,653 A | 12/1984 | Olmstead |
| 4,675,580 A | 6/1987 | Dietz |
| 4,683,405 A | 7/1987 | Truskalo et al. |
| 5,345,151 A | 9/1994 | George |
| 5,528,112 A | 6/1996 | George et al. |
| 6,025,680 A * | 2/2000 | Kitou et al. ................. 315/371 |

* cited by examiner

Primary Examiner—David Vu
(74) Attorney, Agent, or Firm—Joseph S. Tripoli; Harvey D. Fried; Sammy S. Henig

(57) ABSTRACT

A dynamic focus voltage generator includes a source of a flyback input signal at a horizontal deflection frequency. A double integrator is responsive to the input signal for generating a parabolic periodic signal. An amplitude detector is responsive to the parabolic periodic signal for generating a control signal that is indicative of an amplitude of the parabolic periodic signal. A comparator is responsive to a signal at a reference level and to the control signal and coupled to the double integrator for regulating an amplitude of the parabolic periodic signal in a gain control negative feedback manner. A non-linear network is responsive to the parabolic periodic signal for producing a bathtub shaped output signal that is coupled to a focus electrode of a cathode ray tube.

10 Claims, 3 Drawing Sheets

DYNAMIC FOCUS VOLTAGE AMPLITUDE CONTROLLER

CROSS REFERENCE TO RELATED APPLICATIONS

This is a non-provisional application that claims the benefit of provisional application Serial No. 60/282,782 filed Apr. 10, 2001.

BACKGROUND OF THE INVENTION

The invention relates to a beam landing distortion correction arrangement.

An image displayed on a cathode ray tube (CRT) can suffer from imperfections or distortions such as defocusing or nonlinearity that is incidental to the scanning of the beam on the CRT. Such imperfections or distortions occur because the distance from the electron gun of the CRT to the faceplate varies markedly as the beam is deflected, for example, in the horizontal direction. Reduction in the amount of defocusing that occurs as the beam is deflected in the horizontal direction, for example, may be obtained by developing a dynamic focus voltage having a parabolic voltage component at the horizontal rate and applying the dynamic focus voltage to a focus electrode of the CRT for dynamically varying the focus voltage.

It is known how to derive the parabolic voltage component at the horizontal rate from an S-correction voltage developed across the S-shaping capacitor of a horizontal deflection output stage. However, in a deflection circuit in which neither of the terminals of the "S-shaping" capacitor is at an alternating current (AC) ground potential, referred to as floating above ground level, the extraction of the parabolic voltage can be, undesirably, too complicated. Therefore, where the "S-shaping" capacitor is floating above ground level it can be desirable to generate a parabolic, low-level dynamic focus waveform without extracting the waveform from the voltage developed across the S-shaping" capacitor. For example, a diode modulator type circuit for correcting pincushion distortion can have the "S-shaping" capacitor floating above the ground reference level. This makes it impractical to use the parabolic voltage waveform developed across such "S-shaping" capacitor for producing the dynamic focus waveform.

A television receiver, computer display or monitor can have the capability of displaying picture information on the same CRT using a deflection current at selectively different horizontal scan frequencies. In a multifrequency horizontal deflection system it can be desirable to keep the peak-to-peak voltage of the dynamic focus waveform constant when the AC waveforms in the deflection circuit are changing with different frequencies. The required amplitudes of the parabolic voltage component of the dynamic focus voltage can need to be the same at each horizontal deflection frequency. Therefore, it can be desirable to control the amplitudes of the parabolic voltage component of the dynamic focus voltage at the different horizontal frequencies. Furthermore, instead of a parabolic voltage component of the dynamic focus voltage, a "bathtub" shaped voltage waveform can be desirable for the newer tubes such as the "true flat" CRT's.

SUMMARY OF THE INVENTION

A video apparatus, embodying an inventive feature, includes a parabola generator responsive to an input signal for generating a parabolic periodic signal to produce a field in a beam path of a cathode ray tube that varies in accordance with the parabolic periodic signal. An amplitude detector is responsive to the parabolic periodic signal for generating a control signal that is indicative of an amplitude of the parabolic periodic signal. A comparator responsive to a signal at a reference level and to the control signal and coupled to the parabola generator for regulating the amplitude of the parabolic periodic signal in a gain control negative feedback manner.

DESCRIPTION OF THE PREFERRED EMBODIMENTS

Figure 1A:
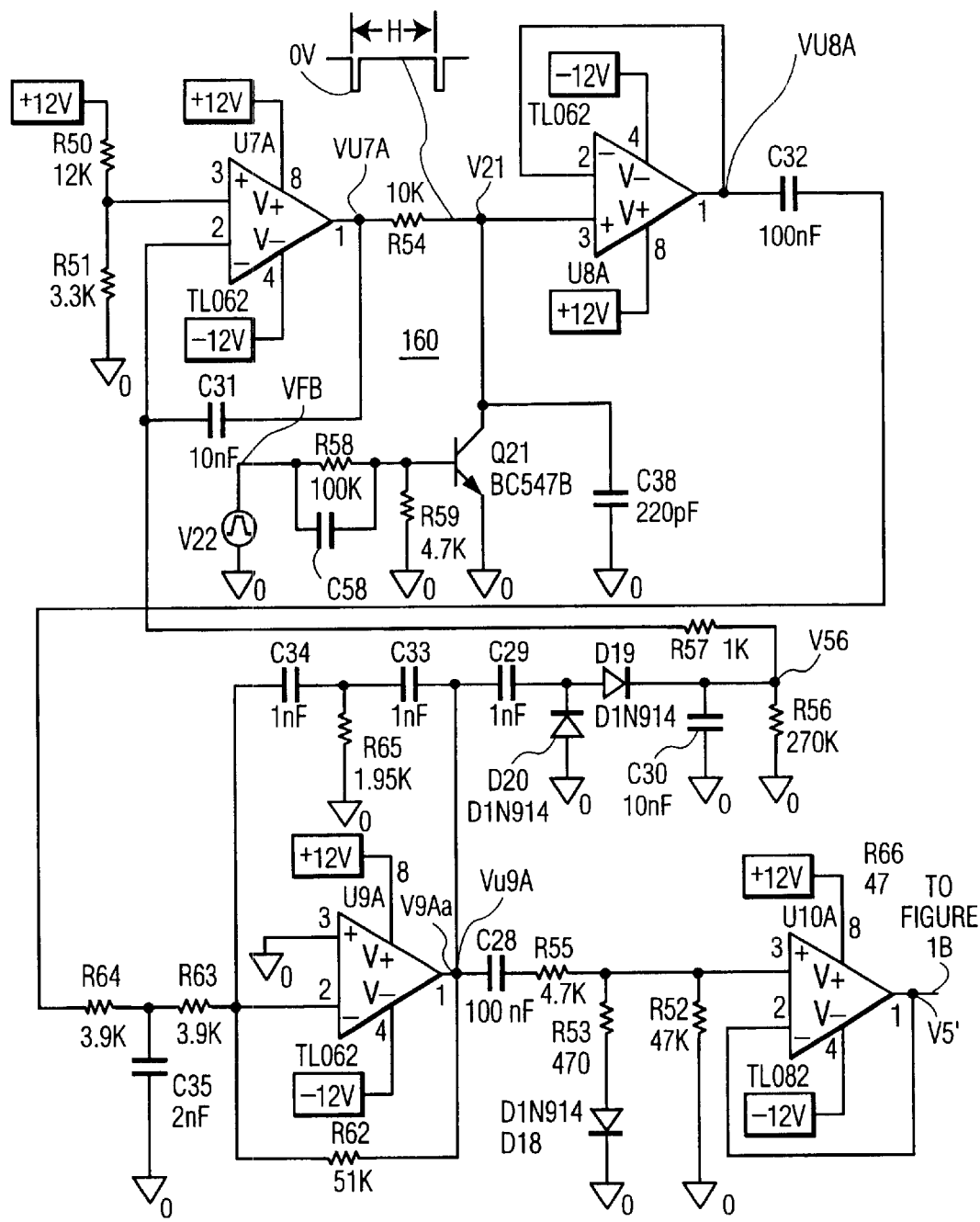
FIG. 1A illustrates a parabola generator, embodying an inventive feature.

FIG. 1A illustrates a parabola generator, embodying an inventive feature. FIGS. 2a, 2b, 2c and 2d illustrate waveforms useful for explaining the operation of the arrangement of FIG. 1A. Similar symbols and numerals in FIGS. 1, 2a, 2b, 2c and 2d indicate similar items or functions.

An amplifier U7A of FIG. 1A is used as an error amplifier and a low pass filter. Amplifier U7A receives a reference voltage at its non-inverting input terminal that is determined by a voltage divider of resistors R50 and R51. A gain control voltage V56 is coupled to an inverting input terminal of amplifier U7A via a resistor R57. A relatively constant direct current (DC) voltage VU7A is coupled to a pull-up resistor R54 of a rectangular waveform generator 160. Voltage VU7A is coupled via resistor R54 to a collector of a switching transistor Q21 and to a phase delaying capacitor C38 of rectangular waveform generator 160.

Figure 2A:
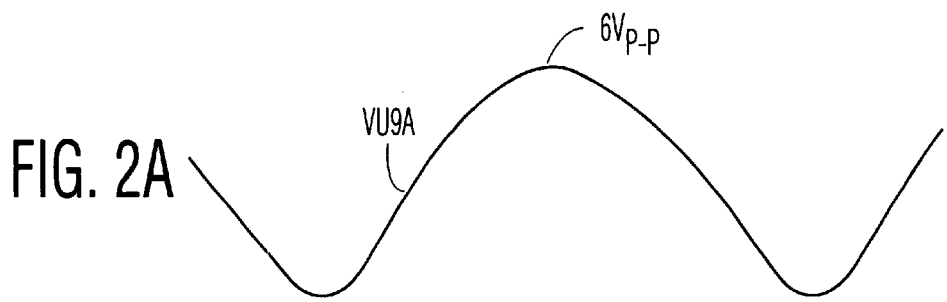
FIGS. 2a, 2b, 2c and 2d illustrate waveforms useful for explaining the operation of the arrangement of FIG. 1A.
Figure 2B:
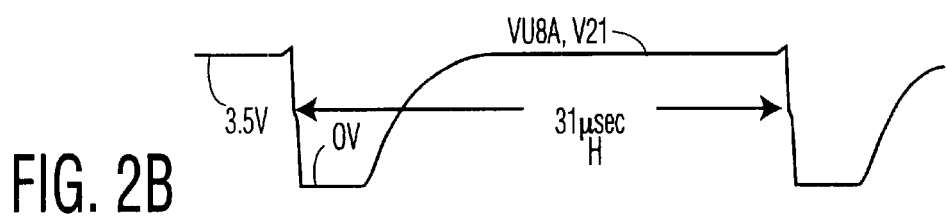
Figure 2C:
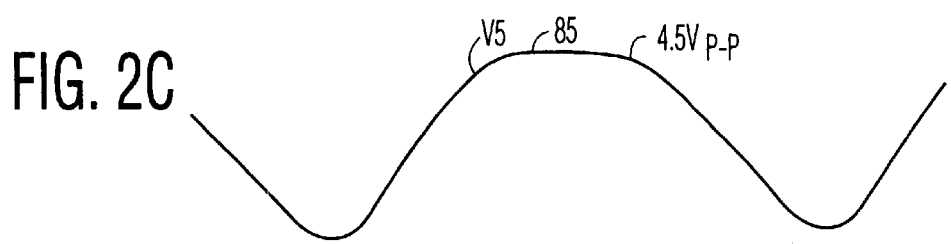
Figure 2D:
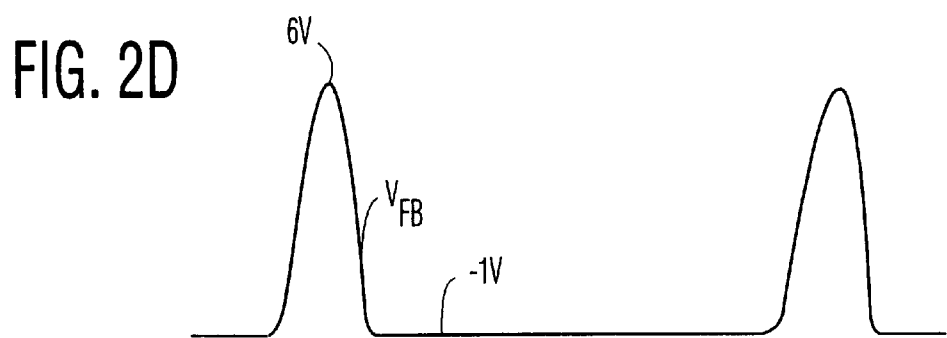

A flyback pulse voltage generator V22 produces a horizontal flyback pulse voltage waveform VFB of FIG. 2d having a frequency, for example, 32 KHz and a corresponding period H. The frequency of horizontal flyback pulse voltage waveform VFB may be selected from a range of frequencies. In a television receiver, horizontal flyback pulse voltage waveform VFB would be produced from a flyback transformer or an input choke, not shown, used to supply power to a horizontal deflection output stage in a conventional manner. Flyback pulse voltage waveform VFB is at the same frequency and phase as a horizontal deflection current in a deflection winding, not shown. Flyback pulse voltage waveform VFB is coupled via a base resistor R58 of FIG. 1A to the base of transistor Q21 for controlling the switching operation in transistor Q21. The switching operation in transistor Q21 produces a rectangular waveform V21 of FIG. 2b at the collector of transistor Q21 of FIG. 1A and across capacitor C38 at the selected horizontal frequency. Capacitor C38 provides phase shifting of rectangular waveform voltage V21. The phase shifting of rectangular waveform voltage V21 is employed to provide dynamic focus waveform centering. In practice, it was found that an additional capacitor C58 may be required to be placed in parallel with base resistor R58 of transistor Q21 in order to provide phase shifting of rectangular waveform V21.

Amplitude controlled rectangular voltage waveform V21, developed at the collector of transistor Q21, is buffered by a unity gain buffer amplifier U8A for producing a buffered output rectangular voltage waveform VU8A of FIG. 2b.

Rectangular voltage waveform VU8A is capacitively coupled via a capacitor C32 of FIG. 1A to a double integrator 150 having a conventional topology. Capacitor C32 prevents a DC component of rectangular voltage waveform VU8A from driving an output voltage VU9A of double integrator 150 outside of its operating range. However, in an embodiment not shown, two single integrators in cascade may be use, instead. Buffer amplifier U8A is desirable for preventing a changing input impedance of double integrator 150 from distorting rectangular voltage waveform VU8A. Buffer amplifier U8A thus provides a constant drive impedance for double integrator 150.

Double integrator 150 generates a horizontal parabola voltage waveform VU9A of FIG. 2a from rectangular voltage waveform VU8A of FIG. 2b that is both phase and frequency locked to signal VFB of FIG. 2d. Double integrator, or parabola generator 150 of FIG. 1A, includes an amplifier U9A. An input network formed by a series arrangement of a resistor R63 and a resistor R64 is coupled between capacitor C32 and an inverting input terminal of amplifier U9A. A capacitor C35 is coupled between ground and between resistors R64 and R63. An alternating current (AC) feedback network includes a series arrangement of an integrator capacitor C33 and an integrator capacitor C34 that is coupled between an output terminal V9Aa of amplifier U9A and the inverting input terminal of amplifier U9A. A resistor R65 is coupled between ground and between capacitors C33 and C34. A DC feedback resistor R62, which has a much higher impedance than any of the double integrator's elements, is used to establish the DC operation point of operational amplifier U9A. Without resistor R62, a DC offset voltage of double integrator 150 would cause an output voltage VU9A of FIG. 2a of amplifier U9A of FIG. 1A to reach a level approximately of a supply voltage V− or V+ of amplifier U9A and remains at that level indefinitely. Output voltage VU9A of amplifier U9A is coupled to an AC coupling capacitor C29 of a peak-to-peak detector 161. However, in an embodiment not shown, a peak detector may be used, instead.

Peak-to-peak detector 161 also includes a diode D20 having a cathode that is coupled to capacitor C29 remote from terminal U9Aa and an anode at ground potential for providing voltage doubling. The anode of a diode D19 is coupled to a terminal between capacitor C29 and diode D20 and a cathode that is coupled to a filter capacitor C30 and to a bleeder resistor R56 for generating output voltage V56. As indicated before, gain control voltage V56 is coupled to inverting input terminal of amplifier U7A and is compared with the reference voltage level developed at a terminal between resistor R50 and resistor R51. Thereby, the amplitude of parabolic voltage VU9A of amplifier U9A is maintained the same at, for example, each horizontal deflection frequency selected from a range of horizontal deflection frequencies.

For example, when the peak-to-peak amplitude of voltage VU9A tends to increase, voltage V56 tends to increase. Consequently, voltage VU7A of amplifier U7A tends to decrease. As a result, the peak-to-peak magnitude of voltage V21 tends to decrease. The decrease in the peak-to-peak magnitude of voltage V21 tends to cause a decrease in the peak-to-peak amplitude of voltage VU9A in a manner to keep the peak-to-peak amplitude of voltage VU9A constant.

Output voltage VU9A of amplifier U9A is also coupled to a capacitor C28 of a wave shaper circuit 151. A resistor R55 is coupled to a parallel arrangement of a resistor R52 and a resistor R53, coupled in series with a diode D18, to form a non-linear voltage divider. When diode D18 is conductive, a voltage developed at a non-inverting input terminal of a buffer amplifier U10A is established by a ratio between resistor R55 and the parallel arrangement of resistor R52 and resistor R53. Buffer amplifier U10A generates a horizontal rate drive voltage V5' of FIG. 2c having a modified bathtub shape. Horizontal rate drive voltage V5' has the same amplitude at each deflection frequency.

When diode D18 of FIG. 1A is non-conductive, resistor R53 does not have an effect on the horizontal rate drive voltage V5' of FIG. 2c. Therefore, signal VU9A of FIG. 1A is coupled to amplifier U10A via a lesser attennuation then, when diode D18 conducts, such as during a portion 85 of voltage V5' of FIG. 2c. Thereby, bathtub shaped voltage V5' is clipped, during portion 85, during the center of horizontal scan. The percentage of clipping done to bathtub shaped voltage V5' is controlled during a center of horizontal scan.

Figure 1B:
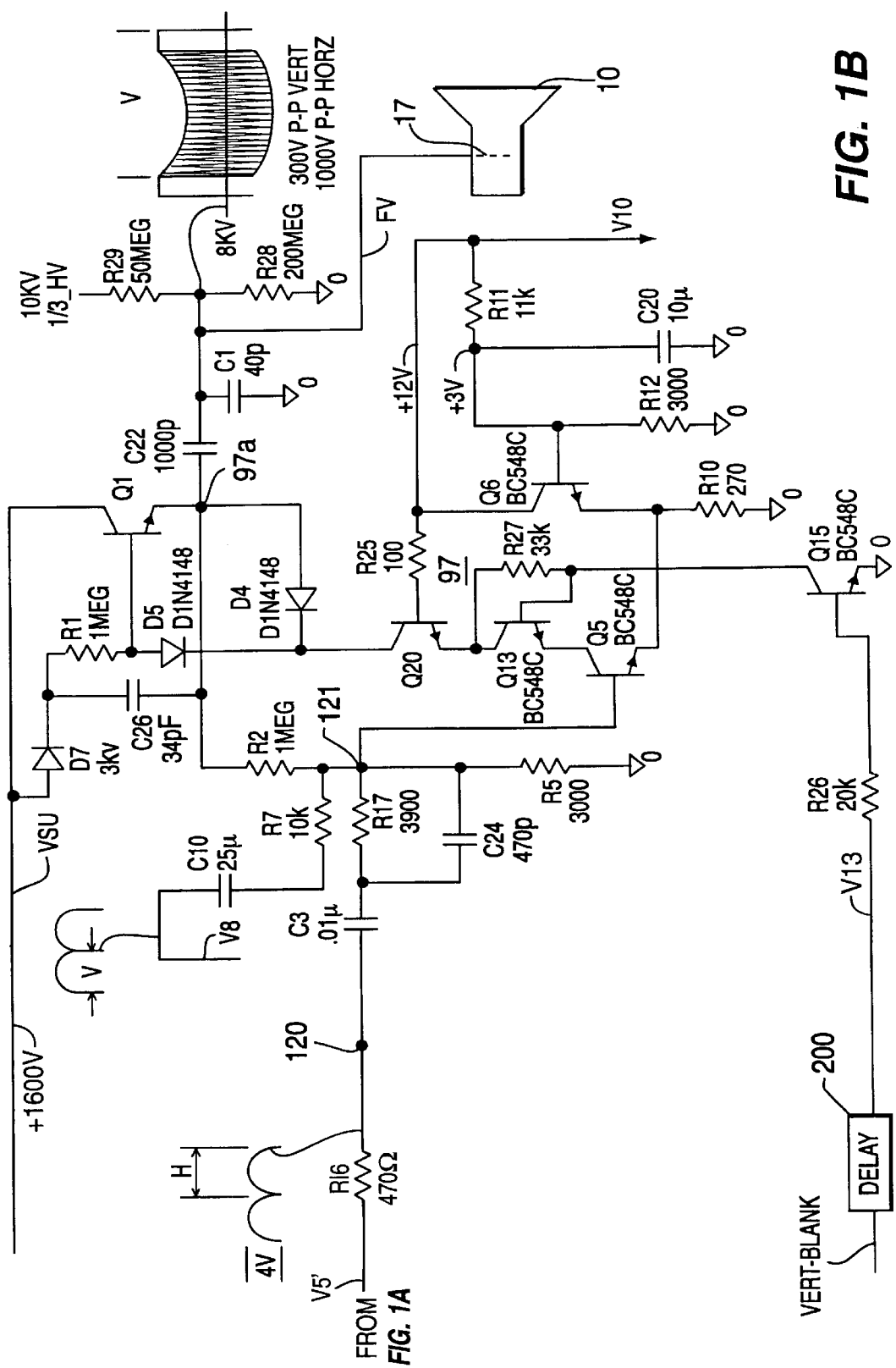
FIG. 1B illustrates a dynamic focus voltage generator that is responsive to an output of the parabola generator of FIG. 1A.

FIG. 1B illustrates a dynamic focus voltage amplifier 97. Similar symbols and numerals in FIGS. 1A, 1B, 2a, 2b, 2c and 2d indicates similar items or functions.

Horizontal rate drive voltage V5' of FIG. 1B, developed at terminal 120, is capacitively coupled via a capacitor C3, coupled in series with a resistor R17, to the base of a transistor Q5. A capacitor C10 capacitively couples a vertical parabola V8, produced in a conventional manner, not shown, to terminal 121. The direct current operating point of focus amplifier 97 is determined by a resistor R5 and a resistor R2 and not by the parabolic signals, because the capacitive coupling eliminates a direct current component. A capacitor C24 corrects a phase delay caused by a stray input capacitance, not shown, of amplifier 97 so that the horizontal focus correction is properly timed.

In amplifier 97, transistor Q5 and a transistor Q6 are coupled to each other to form a differential input stage. These transistors have very high collector current-to-base current ratio, referred to as beta, to increase the input impedance at terminal 121. The base-emitter junction voltages of transistors Q5 and Q6 compensate each other and reduce direct current bias drift with temperature changes. Resistor R11 and resistor R12 form a voltage divider that is applied to a supply voltage V10 at +12V for biasing the base voltage of transistor Q6 at about +2.6V. The value of an emitter resistor R10 that is coupled to the emitters of transistors Q5 and Q6 is selected to conduct a maximum current of about 6 mA. This protects a high voltage transistor Q20. Transistor Q20 is coupled to transistor Q5 via a transistor Q13 operating as a switch. Transistor Q20 is coupled to transistor Q5 via transistor Q13 in a cascode configuration. Transistor Q20 needs to be protected from being over-driven because transistor Q20 can tolerate only up to 10 mA collector current. This is accomplished because amplifier 97 has high transconductance at a collector current of up to 6 mA and lower transconductance above 6 mA. The cascode configuration of transistors Q20, Q13 and Q5 isolates the Miller capacitance, not shown, across the collector-base junction of transistor Q20, and thereby the bandwidth is increased. The cascode configuration also makes the amplifier gain independent of the low beta of high voltage transistor Q20.

A supply voltage VSU is produced in a conventional manner for energizing dynamic focus voltage amplifier 97. An active pull up transistor Q1 has a collector coupled to supply voltage VSU. A base pull-up resistor R1 of transistor Q1 is coupled to voltage VSU via a bootstrap or boosting arrangement that includes a diode D7 and a capacitor C26. A diode D5 is coupled in series with resistor R1 and is coupled to the collector of transistor Q20. A diode D4 is coupled between the emitter of transistor Q1 at terminal 97a and the collector of transistor Q20.

During the negative peaks of the output waveform at terminal 97a, diode D7 clamps an end terminal of capacitor C26 at the cathode of diode D7 to the +1600V supply voltage VSU and transistor Q20 pulls the other end terminal of capacitor C26 to near ground potential. Transistor Q1 is held off by the actions of diodes D4 and D5. As the voltage at terminal 97a rises, the energy stored in capacitor C26 is fed through resistor R1 to the base of transistor Q1. The voltage across resistor R1 is maintained high, and base current in transistor Q1 also is maintained, even as the collector-to-emitter voltage across transistor Q1 approaches zero. Therefore, transistor Q1 emitter current is maintained. The output positive peak at terminal 97a can then be very near the +1600V supply voltage VSU without distortion.

A capacitance C1 represents the sum of the stray capacitance of focus electrode 17 and of the wiring. Active pull-up transistor Q1 is capable of sourcing a current from terminal 97a to charge stray capacitance C1. Pull-down transistor Q20 is capable of sinking current via diode D4 from capacitance C1. Advantageously, the active pull up arrangement is used to obtain fast response time with lowered power dissipation. Amplifier 97 uses shunt feedback for the output at terminal 97a via a feedback resistor R2. Resistors R5 and R2 are selected to produce 1000V horizontal rate voltage at terminal 97a. As a result, the voltage gain of amplifier 97 is several hundred.

Dynamic focus voltage components at the horizontal rate produced by voltage V5' and at the vertical rate produced by voltage V8 are capacitively coupled via a direct current blocking capacitor C22 to a focus electrode 17 of a CRT 10 to develop a dynamic focus voltage FV. A direct current voltage component of voltage FV, developed by a voltage divider formed by a resistor R28 and a resistor R29, is equal to 8 KV.

A periodic control signal V13 is at a HIGH state, during vertical blanking and during, for example, the time of the four video lines that follow the vertical blanking, referred to as the AKB measurement interval, not shown. Signal V13 is produced by a delay circuit 200 that delays a conventional vertical blanking signal VERT-BLANK by a suitable number of video lines such as four. Signal V13 is coupled via a resistor R26 to the base of a switch transistor Q15. The collector of transistor Q15 is coupled via a resistor R27 to a junction terminal between the emitter of transistor Q20 and the collector of transistor Q13. The collector of transistor Q13 is coupled to the emitter of transistor Q20 and the emitter of transistor Q13 is coupled to the collector of transistor Q5. During vertical blanking and during the AKB measurement interval, transistor Q13 is turned off by transistor Q15 and blocks the flow of current from the collector of transistor Q5 to the emitter of transistor Q20.

Advantageously, emitter current for Q20 is maintained during the AKB measurement interval via resistor R27 and transistor Q15. Resistor R27 is coupled between the emitter of transistor Q20 and ground during the AKB measurement interval. During the AKB measurement interval, resistor R27 has across it a constant voltage of about 11.3 volts. The value of resistor R27 is chosen to cause a constant current in transistor Q20 such that a voltage developed across resistor R1 is equal to the difference between supply voltage VSU and the peak value of the dynamic focus voltage at terminal 97a. This eliminates an undesired focus voltage transient and first video line misfocusing that could otherwise occur when the normal dynamic focus voltage starts after the AKB measurement interval. If resistor R27 were not coupled to the emitter of transistor Q20, amplifier 97 output votage at terminal 97a would tend to reach the +1600V level of supply voltage VSU. However, the required peak of the waveform at terminal 97a is typically 1450V. If the amplifier output voltage at terminal 97a were to become 1600V, during the AKB measurement interval, a large transient would have occurred at the start of the first visible horizontal line, at the top of the picture. The transient, disadvantageously, would have caused the beginning portion of the first visible horizontal line, that occurs following the AKB measurement interval, to be defocused.

To prevent such large transient, the current in transistor Q15, which provides current path to transistor Q20 through resistor R27, decreases the output voltage at terminal 97a, during vertical blanking and during the AKB measurement interval. Transistor Q20 acts as a current source and causes a voltage drop across resistor R1. During the AKB measurement interval, the dynamic focus voltage at terminal 97a is set to a level approximately equal to the peak of the summed horizontal and vertical parabolic components. Thereby, advantageously, the focus voltage transient is significantly reduced following the AKB measurement interval.

What is claimed is:

1. A video apparatus for generating a parabolic periodic signal at a frequency related to a deflection frequency, comprising:

a source of an input signal at a frequency related to a deflection frequency;

a parabola generator responsive to said input signal for generating a parabolic periodic signal to produce a field in a beam path of a cathode ray tube that varies in accordance with said parabolic periodic signal;

an amplitude detector responsive to said parabolic periodic signal for generating a control signal that is indicative of an amplitude of said parabolic periodic signal; and a comparator responsive to a signal at a reference level and to said control signal and coupled to said parabola generator for regulating the amplitude of said parabolic periodic signal in a gain control negative feedback manner.

2. A video apparatus according to claim 1 wherein said input signal is selected from a range of frequencies and wherein said amplitude of said parabolic periodic signal is regulated in said gain control negative feedback manner at each selected deflection frequency.

3. A video apparatus according to claim 1 wherein said parabola generator comprises a double integrator.

4. A video apparatus according to claim 1 wherein said parabolic periodic signal is coupled to a focus electrode of said cathode ray tube for providing dynamic focus voltage.

5. A video apparatus according to claim 1 wherein said amplitude detector comprises a peak-to-peak detector forming a voltage doubler.

6. A video apparatus according to claim 1 further comprising, a non-linear network responsive to said parabolic periodic signal for producing a bathtub shaped output signal to produce said field in said beam path.

7. A video apparatus according to claim 1 wherein said parabola generator comprises a rectangular voltage generator responsive to said control signal and coupled to an integrator that generates said parabolic periodic signal.

8. A video apparatus according to claim 1 wherein said input signal comprises a flyback signal of a deflection circuit.

9. A video apparatus for generating a periodic signal at a frequency related to a deflection frequency, comprising:
- a source of an input signal at a frequency related to a deflection frequency;
- a double integrator responsive to said input signal for generating an output periodic signal to produce a field in a beam path of a cathode ray tube that varies in accordance with said output periodic signal; and
- a comparator responsive to a signal at a reference level and to said output periodic signal and coupled to said double integrator for regulating an amplitude of said output periodic signal in a gain control negative feedback manner.

10. A video apparatus for generating a parabolic periodic signal at a frequency related to a deflection frequency, comprising:
- a source of an input signal at a frequency related to a deflection frequency;
- a parabola generator responsive to said input signal for generating a parabolic periodic signal; and
- a non-linear network responsive to said parabolic periodic signal for producing a bathtub shaped output signal to produce a field in a beam path of a cathode ray tube that varies in accordance with said bathtub shaped output signal.

* * * * *